(12) United States Patent
Beveridge et al.

(10) Patent No.: US 10,621,276 B2
(45) Date of Patent: Apr. 14, 2020

(54) USER INTERFACE VIRTUALIZATION FOR WEB APPLICATIONS

(71) Applicant: VMware, Inc., Palo Alto, CA (US)

(72) Inventors: Daniel James Beveridge, Apollo Beach, FL (US); Scott Howard Davis, Needham, MA (US)

(73) Assignee: WMware, Inc., Palo Alto, CA (US)

( * ) Notice: Subject to any disclaimer, the term of this patent is extended or adjusted under 35 U.S.C. 154(b) by 0 days.

(21) Appl. No.: 14/062,326

(22) Filed: Oct. 24, 2013

(65) Prior Publication Data
US 2015/0121193 A1 Apr. 30, 2015

(51) Int. Cl.
G06F 17/20 (2006.01)
G06F 17/22 (2006.01)
G06F 16/958 (2019.01)
G06F 3/0481 (2013.01)
G06F 17/24 (2006.01)

(52) U.S. Cl.
CPC ........ *G06F 17/2247* (2013.01); *G06F 3/0481* (2013.01); *G06F 16/972* (2019.01); *G06F 17/243* (2013.01)

(58) Field of Classification Search
CPC ..... G06F 17/2247; G06F 17/24; G06F 17/211
See application file for complete search history.

(56) References Cited

U.S. PATENT DOCUMENTS

| 5,897,644 A * | 4/1999 | Nielsen | G06F 9/451 |
| | | | 715/210 |
| 6,167,523 A | 12/2000 | Strong | |
| 6,662,340 B2 | 12/2003 | Rawat et al. | |
| 6,690,403 B1 * | 2/2004 | Tuli | G06F 16/9577 |
| | | | 715/854 |
| 6,725,238 B1 | 4/2004 | Auvenshine | |
| 6,851,087 B1 | 2/2005 | Sibert | |
| 6,920,480 B2 | 7/2005 | Mitchell et al. | |

(Continued)

FOREIGN PATENT DOCUMENTS

JP 2005-506595 A 3/2005
JP 2010-226737 A 10/2010
(Continued)

OTHER PUBLICATIONS

Extended European Search Report, dated Jul. 22, 2013, Application No. EP 13164249.8 7 pages.
(Continued)

*Primary Examiner* — Shahid K Khan
(74) *Attorney, Agent, or Firm* — Patterson + Sheridan, LLP

(57) ABSTRACT

User interface virtualization describes a technique for providing a user with access to a web application from a computing device, while translating the ergonomics of the web application's user interface style into the ergonomics of the computer device's. A proxy agent exchanges metadata and input events with a corresponding client running on a client device that accepts a "touch and swipe" style input. The proxy agent parses web content, such as markup documents and scripting code, that makes the presentation tier of the web application. The client constructs and displays native graphical user interface elements at the client device that are virtual representations of a corresponding user interface element of the web application.

24 Claims, 6 Drawing Sheets

(56) References Cited

U.S. PATENT DOCUMENTS

| | | | |
|---|---|---|---|
| 7,020,721 B1* | 3/2006 | Levenberg | H04L 67/2828 709/218 |
| 7,216,292 B1 | 5/2007 | Snapper et al. | |
| 7,275,212 B2 | 9/2007 | Leichtling | |
| 7,418,472 B2 | 8/2008 | Shoemaker et al. | |
| 7,676,549 B2 | 3/2010 | McKeon et al. | |
| 8,271,675 B2 | 9/2012 | Oh et al. | |
| 8,539,039 B2 | 9/2013 | Sheu et al. | |
| 8,650,494 B1* | 2/2014 | Sampath et al. | 715/740 |
| 8,738,814 B1 | 5/2014 | Cronin | |
| 8,793,650 B2 | 7/2014 | Hilerio et al. | |
| 8,938,726 B2* | 1/2015 | Barak | G06F 9/445 717/147 |
| 9,026,905 B2* | 5/2015 | Tseng | G06F 3/04847 715/238 |
| 9,055,139 B1 | 6/2015 | Devireddy et al. | |
| 9,176,751 B2 | 11/2015 | Colelli et al. | |
| 9,195,636 B2 | 11/2015 | Smith et al. | |
| 9,197,718 B2 | 11/2015 | Kiang et al. | |
| 9,204,118 B2 | 12/2015 | Oh et al. | |
| 9,213,684 B2* | 12/2015 | Lai | G06F 17/214 |
| 9,292,484 B1 | 3/2016 | Plow et al. | |
| 9,292,833 B2 | 3/2016 | Savage | |
| 9,311,071 B2 | 4/2016 | Tan et al. | |
| 9,400,585 B2* | 7/2016 | Momchilov | G06F 3/0481 |
| 9,471,553 B2* | 10/2016 | Ligman | G06F 17/2247 |
| 9,549,045 B2 | 1/2017 | Jooste | |
| 9,612,724 B2* | 4/2017 | Laborczfalvi | G06F 3/0484 |
| 9,614,892 B2 | 4/2017 | Bidarkar et al. | |
| 9,852,115 B2 | 12/2017 | Little et al. | |
| 9,870,202 B2 | 1/2018 | Hermanns | |
| 2002/0111995 A1 | 8/2002 | Mansour et al. | |
| 2004/0239681 A1* | 12/2004 | Robotham et al. | 345/581 |
| 2006/0048051 A1* | 3/2006 | Lazaridis | G06F 16/9577 715/248 |
| 2006/0212798 A1* | 9/2006 | Lection | G06F 9/54 715/234 |
| 2006/0224397 A1* | 10/2006 | Morris | G06F 17/243 235/375 |
| 2007/0133876 A1 | 6/2007 | Chande et al. | |
| 2008/0120393 A1* | 5/2008 | Chen | G06F 17/30905 709/217 |
| 2008/0139191 A1* | 6/2008 | Melnyk | H04L 67/2823 455/419 |
| 2008/0154824 A1 | 6/2008 | Weir et al. | |
| 2008/0255852 A1 | 10/2008 | Hu | |
| 2010/0082733 A1 | 4/2010 | Bernstein et al. | |
| 2010/0268813 A1 | 10/2010 | Pahlavan et al. | |
| 2010/0269046 A1 | 10/2010 | Pahlavan et al. | |
| 2010/0269047 A1 | 10/2010 | Pahlavan et al. | |
| 2010/0269152 A1* | 10/2010 | Pahlavan | H04L 63/08 726/3 |
| 2011/0060997 A1 | 3/2011 | Scoda et al. | |
| 2011/0138295 A1 | 6/2011 | Momchilov et al. | |
| 2011/0246904 A1 | 10/2011 | Pinto et al. | |
| 2011/0314093 A1 | 12/2011 | Sheu et al. | |
| 2012/0042271 A1 | 2/2012 | Ma et al. | |
| 2012/0137211 A1* | 5/2012 | Lewontin | G06F 16/84 715/236 |
| 2012/0137233 A1* | 5/2012 | Lewontin | G06F 16/9577 715/760 |
| 2012/0159310 A1* | 6/2012 | Chang | G06F 8/38 715/239 |
| 2012/0226985 A1* | 9/2012 | Chervets et al. | 715/735 |
| 2012/0311457 A1 | 12/2012 | O'Gorman | |
| 2013/0055102 A1 | 2/2013 | Matthews et al. | |
| 2013/0132856 A1 | 5/2013 | Binyamin et al. | |
| 2013/0246932 A1 | 9/2013 | Zaveri et al. | |
| 2013/0290856 A1 | 10/2013 | Beveridge et al. | |
| 2013/0290857 A1 | 10/2013 | Beveridge | |
| 2014/0013234 A1 | 1/2014 | Beveridge et al. | |
| 2014/0082512 A1 | 3/2014 | Neuert et al. | |
| 2014/0096014 A1* | 4/2014 | Johnson | H04L 41/22 715/733 |
| 2014/0122988 A1 | 5/2014 | Eigner et al. | |
| 2014/0244692 A1* | 8/2014 | Williamson | G06F 17/30923 707/791 |
| 2014/0351684 A1 | 11/2014 | Smit et al. | |
| 2015/0082148 A1* | 3/2015 | Lai | G06F 17/214 715/235 |
| 2015/0121193 A1 | 4/2015 | Beveridge et al. | |
| 2016/0216860 A1 | 7/2016 | Beveridge | |
| 2017/0293454 A1 | 10/2017 | Beery | |

FOREIGN PATENT DOCUMENTS

| | | |
|---|---|---|
| JP | 2012079084 A | 4/2012 |
| WO | 02065280 A2 | 8/2002 |

OTHER PUBLICATIONS

Cheng-Li Tsao: "SmartVNC: SmartVNC: An Effective Remote Computing Solution for Smartphones", Sep. 23, 2011 (Sep. 23, 2011), pp. 13-24, XP055070896, ACM, [retrieved from the Internet Jul. 11, 2013].

Australian Office Action Patent Application No. 2013204723 dated Nov. 12, 2014, 3 pages.

JP 2013-091433 Office Action dated Feb. 9, 2016, Consists of 8 pages English translation and 8 Pages Japanese translation.

Toyama, "Javascript + browser explore", Web+DB Press, Japan, Gijutsu-Hyophron Co., Ltd., Mar. 25, 2009, First Edition, vol. 49, pp. 160-167.

Fukuda, "Make the Strongest Linux machine with simple and low cost", Nikkei Linux, Japan, Nikkei Business Publications, Aug. 8, 2012, No. 14, vol. 9, pp. 54-60.

Chinese Office Action dated Feb. 4, 2017, filed in Chinese counterpart Application No. 201310163464.X, 8 pages.

European Search Report dated Jul. 5, 2017 in related European Patent Application 13164249.8-1954.

Appcelerator; website home page—http://www.appcelerator.com/, accessed Jun. 13, 2014, 4 pages.

Capriza; website home page—https://www.capriza.com/, accessed Jun. 13, 2014, 3 pages.

Citrix Mobility Pack; website—http://support.citrix.com/proddocs/topic/receiver/mobility-pack-wrapper.html, accessed Jun. 13, 2014, 1 page.

PhoneGap; website home page—http://phonegap.com/, accessed Jun. 13, 2014, 4 pages.

* cited by examiner

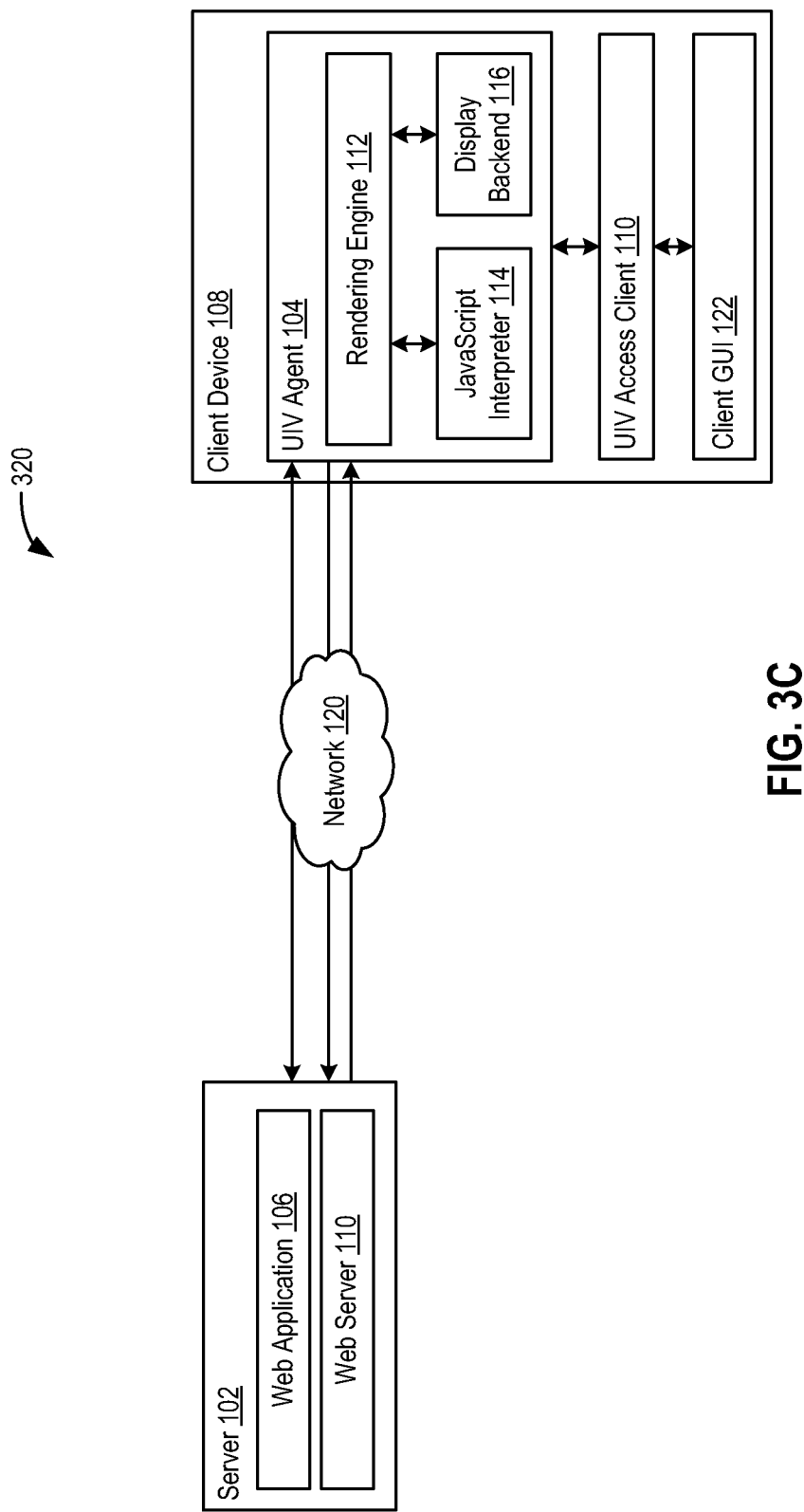

USER INTERFACE VIRTUALIZATION FOR WEB APPLICATIONS

BACKGROUND

Users of client devices with touch-screens face several challenges when interfacing with traditional web applications intended for access by a browser at a terminal with a full-size display. One challenge relates to attempts to remotely control a conventional "point-and-click" driven interface (e.g., Windows® interface) from a touch-screen device which is designed not for traditional "point-and-click" interactions, but rather, for touch-screen gestures and "finger swipe" style of interactions. To address these challenges, it is known in the art to serve a modified "mobile" version of a web application or web site upon detecting touch screen devices which, for example, have increased font size or reduced content. However, these changes require developers to actively create an entirely separate version of a web application, which can be costly and time-consuming, and may not feasible for many legacy web applications already deployed. Consequently, there is a need for improved systems and methods for providing access to a web application one style of user interface to a client device having a different style of user interface.

SUMMARY

One or more embodiments of the present disclosure provide a method of providing access to a web application executing on a server device. The method includes receiving, from a web server, web content associated with a web application, wherein the web content includes a markup document and interpreted program code. The method further includes rendering the web content to generate a graphical representation of the web application, and detecting a portion of the web content that specifies a web user interface (UI) element for the web application. The method includes generating UI metadata that specifies content of the web UI element for the web application based on the detected portion of the web content, and transmitting the rendered web content and the UI metadata to a touch input client device.

Embodiments of the present application provide a method of generating a local graphical user interface on a touch screen of a client device for a web application executing on a server device. The method includes receiving, from a proxy agent, (i) rendered web content and (ii) user interface (UI) metadata that specifies content of a web user interface (UI) element for the web application. The method further includes generating, at the client device, a native UI element based on the received UI metadata, wherein the native UI element corresponds to the web UI element of the web application. The method includes generating a local graphical user interface having the rendered web content and the native UI element to display on the touch screen of the client device, and responsive to detecting user input via the native UI element, transmitting to the proxy agent an input event indicating user interaction of the corresponding web UI element of the web application.

BRIEF DESCRIPTION OF THE DRAWINGS

FIG. 3C illustrates a system architecture for providing access to a web application executing on a server device via an agent executing local to a client device, according to an alternative embodiment of the present disclosure.

DETAILED DESCRIPTION

Embodiments of the disclosure provide a technique and system for user interactions on a client system with one user interface scheme (e.g., touch screen) to interact with legacy web applications designed with another user interface scheme (e.g., "point-and-click" desktop). In one embodiment, a browser-like agent intercepts content such as markup documents and interpreted script code delivered from a web application, and while rendering the content, extracts information from the content that specifies elements of the web application's user interface. The agent transmits this information as metadata, along with the rendered content, to an application running on a client device (e.g., tablet computer, smart phone). The client application renders the content in a form factor suited for the touch-based user interface scheme, including with local user interface elements generated using the metadata. As used herein, a "user interface" may refer to graphical, textual, auditory information for presentation to the user, and the control sequences (such as keystrokes on a computer keyboard, movements of the computer mouse, and selections with a touchscreen) that a user employs to interact with an application.

Figure 1:
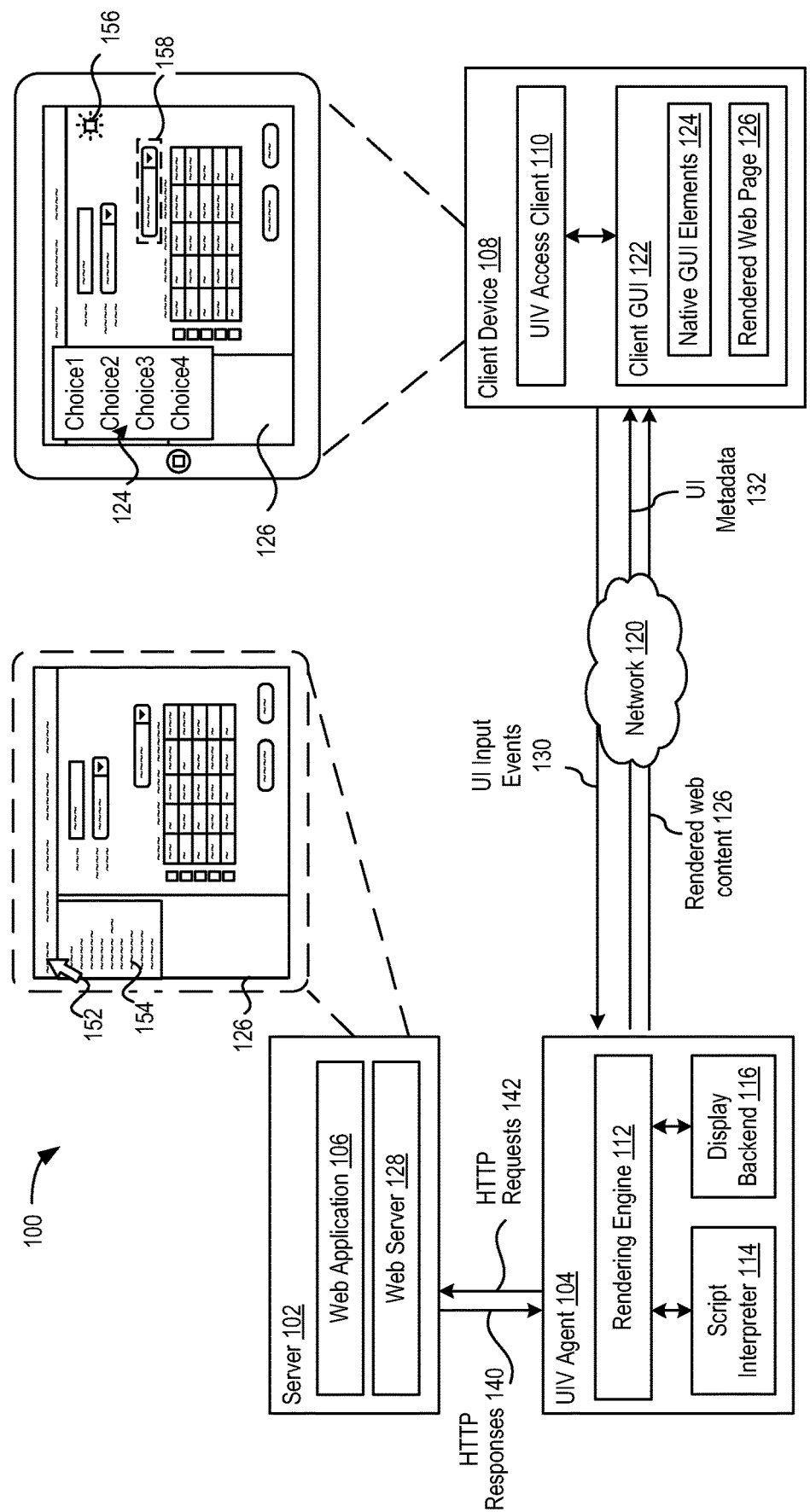
FIG. 1 illustrates a computer system architecture for providing access to a web application executing on a server device from a client device, according to one embodiment of the present disclosure.

FIG. 1 illustrates a computer system architecture 100 for providing access to a web application executing on a server device from a client device, according to one embodiment of the present disclosure. As shown, computer system 100 includes a user interface virtualization (UIV) agent 104 that is connected to a server 102 and a client device 108 via a network 120. In the embodiments described herein, client device 108 may be any computing device having an integrated display output and touch screen input. Client device 108 may have a "touch-and-gesture" style user interface that may differ from the "point-and-click" user interface of a web application 106 provided by server 102.

In the embodiment shown, server 102 includes a web server 128 and a web application 106 executing thereon. Web server 128 is configured to establish Hypertext Transfer Protocol (HTTP) connections with clients, and exchange HTTP messages with connected clients. In one embodiment, web server 128 may execute web application 106 in response to an HTTP request 142 addressed to web application 106 by a uniform resource identifier (URI), sometimes referred to as Uniform Resource Locator (URL), and transmit an HTTP response 140 having web content generated by web application 106. Web application 106 includes application logic, sometimes referred to as an application tier, configured to process requests from a presentation tier (e.g., a web browser) and generates web content for rendering at the presentation tier. The web content provided by web application 106 includes markup language (e.g., HTML), interpreted program code or scripting code executable by a web browser (e.g., JavaScript), image data (e.g., GIF, JPEG files), formatting information (e.g., Cascading Style Sheets), and/or other content, that is rendered by a web browser to generate a user interface (UI) for the web application. While some of the techniques are herein described primarily with respect to specific Web technologies (HTML and JavaScript), other languages or environments may be used instead or in addition. For example, the described techniques may be applied to web applications having a user interface implemented in ActionScript code executable in an Adobe Flash player, or in executable code for other environments such as Microsoft Silverlight.

As shown in a call-out in FIG. 1, web application 106 may have a traditional "point-and-click"-style user interface that relies on input from a pointer (e.g., mouse cursor 152) to manipulate or interact with UI elements 154 of web application 106. The difference in styles of user interface between client device 108 and web application 106 may worsen user experience and turn routine user tasks into frustrating exercises. This problem is depicted in FIG. 1, where the graphical user interface of web application 106 may have widgets and elements that expect manipulation and interaction with a smaller, more precise pointer (e.g., mouse cursor 152), and as such may have a small size that is difficult to target with a touch input.

In one embodiment, UIV agent 104 is configured to connect to server 102 and act as a proxy for client device 108 by "intercepting" and processing web content provided by web application 106. UIV agent 104 is configured to communicate with corresponding UIV access client 110 running on client device 108 to translate between the "point-and-click" style user interface of web application 106 and the "touch-and-gesture" user interface of client device 108. UIV agent 104 may be an application executing on a computer (including physical and virtual machines), in a variety of configurations and architectures as described later in conjunction with FIGS. 3A-3C.

In the embodiment shown in FIG. 1, UIV agent 104 includes a rendering engine 112 configured to render web content received from web application 106 and extract information from the web content that specifies user interface of web application 106. For example, rendering engine 112 may parse an HTML markup document received from web application to generate an HTML layout tree made of HTML elements and to identify portions of the markup that specifies HTML forms, buttons, and other input elements that make up the user interface for web application 106.

In the embodiment shown in FIG. 1, UIV agent 104 includes a rendering engine 112, a script interpreter 114, and a display backend 116. Rendering engine 112 is configured to render web content received from web application 106 and extract information from the web content that specifies the user interface of web application 106. Script interpreter 114 is configured to process and interpret interpreted program code (e.g., JavaScript) that is embedded within the web content or incorporated by reference into the web content (e.g., via <script> tags). In one embodiment, script interpreter 114 is configured to parse interpreted program code within the web content and extract information that specifies the user interface of web application 106. In some embodiments, the extracted information may be packaged as UI metadata 132. Rendering engine 112 may use display backend 116, sometimes referred to as a UI backend, to generate a rendered web page 126 for display. Display backend 116 may be a graphical toolkit that provides drawing and windowing primitives for rendering widgets, graphical images, fonts, and other graphical data for the web content.

UIV agent 104 is configured to transmit rendered web content 126 to UIV access client 110. In some embodiments, rendered web content 126 may include graphical bitmap or framebuffer representing the graphical user interface of web application 106. In other embodiments, rendered web content 126 may include graphical information for drawing widgets, lines, polygons, shapes, fonts, and other display primitives to render an image that displays the GUI of web application 106 at client device 108. In one alternative embodiment, rendered web content 126 may include an intermediate rendered format of web content recently received from web server 128, such as a render tree or render layout resultant from parsing the markup documents, or may even include the original web content received from web server 128, allowing UIV access client 110 to process the web content.

In addition to rendered web content 126 transmitted to UIV access client 110, UIV agent 104 and UIV access client 110 exchange messaging in the form of UI input events 130, and UI metadata 132 which are translated into web application input and native GUI elements, respectively, at the appropriate endpoints.

In one embodiment, UIV access client 110 may be an application configured to display rendered web page 126 as a framebuffer (e.g., similar to a virtual desktop infrastructure). In other embodiments, UIV access client 110 may be a browser-based application having its own rendering engine for processing web content, similar to rendering engine 112, that is responsible for some or all of rendering of web content from web server 128 for display on the client device. In such an embodiment, rendering engine 112 of UIV agent 104 processes web content 126 to extract information from the web content that specifies the user interface of web application 106, and provides to UIV access client 110 a copy of the original web content received from web server 128, allowing the rendering engine of UIV access client 110 to process the web content anew. In some embodiments where the rendering engines of UIV agent 104 and UIV access client 110 share rendering duties, UIV agent 104 may generate and transmit to UIV access client 110 an intermediate rendered format resultant form parsing the web content, such as a render tree or render layout. The rendering engine of UIV access client 110 may then perform final rendering operations on the intermediate rendered format for display on the client device.

UIV access client 110 is configured to construct and display a "native" UI element or widget having the same functionality and information as a corresponding UI element or widget on the web application based on UI metadata 132 received from UIV agent 104. In one embodiment, UIV client 110 may generate a native, "touch-and-gesture"-style GUI element 124 that corresponds to "point-and-click"-style UI element 154 based on UI metadata 132 provided by rendering engine 112 and script interpreter 114. In some embodiments, native GUI elements 124 generated by UIV access client 110 may be different than corresponding UI elements of the web application, such as having differences in size, shape, color, style, manner of interaction, animation, and interactive behavior. For example, UIV access client 110 may use UI metadata 132 derived from a conventional HTML drop-down list on web application 106 to generate a native GUI element that appears like a large wheel that spins in response to swipe gestures. In another example, UIV access client 110 may present a reformatted version of a HTML form optimized for the form factor and touch-screen ergonomics of client device 108. As shown, a native GUI element 124 may be overlaid on top of rendered web page 126 to form a client GUI 122. In one embodiment, UIV access client 110 is configured to use native graphical frameworks or user interface frameworks that are local to client device 108 to render one or more native GUI elements based on the received UI metadata 132.

UIV access client 110 is further configured to capture user input on the constructed native GUI element 124 and transmit UI input events 130 to UIV agent 104. In one embodiment, UIV access client 110 is configured to generate UI input events 130 based on touch input from a user that represents interactions with the native GUI element 124. In one embodiment, UI input events 130 include information indicating that an interaction with the corresponding GUI elements of web application 106 that have been manipulated at the client device 108. In some embodiments, UI input events 130 may indicate a selection of, activation of, change of state in, or interaction with a corresponding web GUI element or option of web application 106. In other embodiments, UI input events 130 may indicate execution or invocation of an operation or option corresponding to a UI element of web application 106. In some embodiments, UI input events 130 may indicate interactions with form elements of an HTML form, including textual input, option selections, and form submission. According to UI input events 130 received from UIV access client 110, UIV agent 104 is configured to formulate an appropriate HTTP request and transmit the HTTP request 142 to web application 106, for example, using web resources located at addresses (e.g., URLs) extracted from previously-parsed web content 126, thereby simulating input and interaction by client device 108 with web application 106.

Figure 2A:
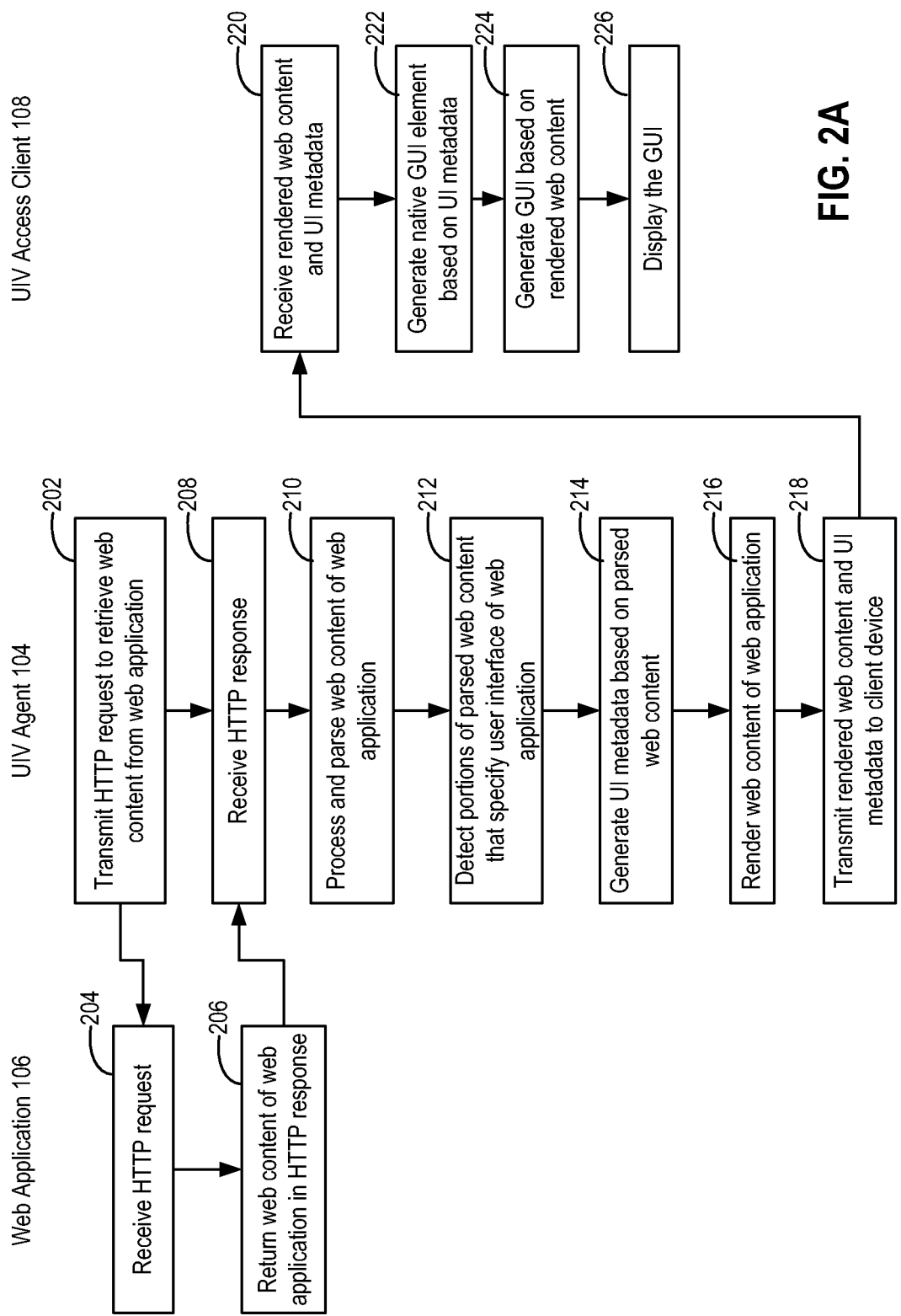
FIGS. 2A-B illustrate flow diagrams for accessing a web application and generating a graphical user interface for the web application that is to be displayed at a client device, according to one embodiment of the present disclosure.
Figure 2B:
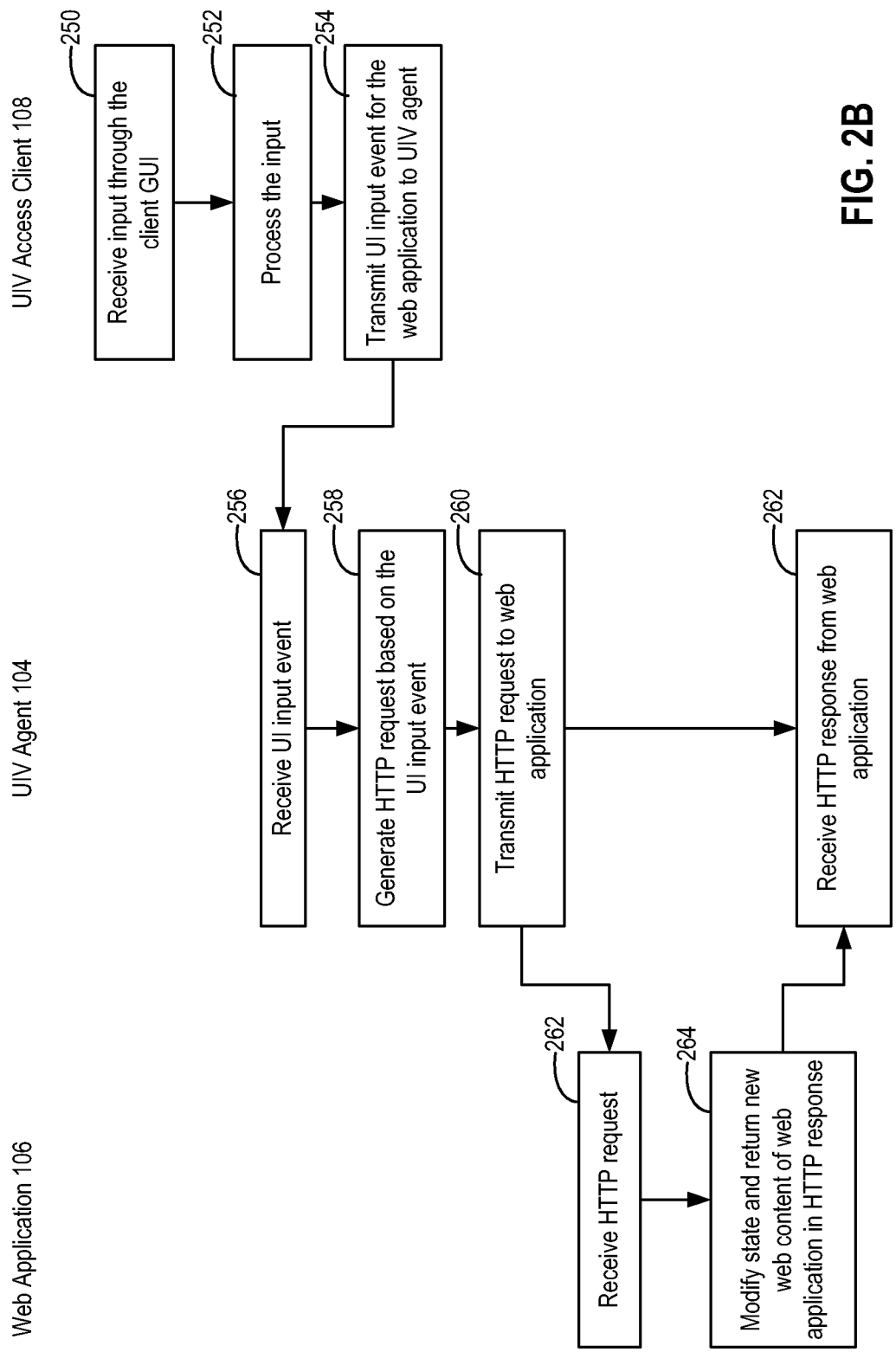

FIGS. 2A-2B are flow diagrams for accessing a web application and generating a graphical user interface for the web application that is to be displayed at a client device, according to one embodiment of the present disclosure. At step 202, UIV agent 104 transmits an HTTP request to retrieve one or more web content from web application 106. The HTTP request may request a resource of the web application found at a particular location (e.g., URL). For example, the HTTP request may include an instruction to "GET http://webapp.example.com/home/http/1.1" which accesses the web application found at http://webapp.example.com/home/.

At step 204, web application 106 receives the HTTP request. Web application 106 processes the HTTP request, which includes executing application logic that generates web content for a presentation tier. At step 206, web application 106 returns web content of web application 106 in an HTTP response. As mentioned earlier, web content may include markup documents having markup language, interpreted program code or scripting code executable by a web browser, image data, formatting information, and other content, that is intended to be rendered by a web browser to generate a user interface for the web application. In one implementation, web content may include a markup document having HTML5 markup language and JavaScript code that presents a programmatic description of the user interface for the web application.

At step 206, UIV agent 104 receives the HTTP response, and at step 208, processes and parses web content of web application 106. In some embodiments, data of the returned web content may be included directly within the HTTP response, or may include identifiers (e.g., URLs) that enable UIV agent 104 to retrieve data of the web content from third-party sources, such as other web servers, content delivery networks, etc. In one embodiment, rendering engine 112 of UIV agent 104 may parse an HTML markup document received from web application to generate an HTML layout tree made of HTML elements.

At step 212, UIV agent 104 detects portions of parsed web content that specify a user interface of web application 106. In some embodiments, rendering engine 112 may identify portions of parsed HTML markup that specifies HTML forms, buttons, and other input elements that make up the user interface for web application 106. Rendering engine 112 may extract information from the identified portions of parsed HTML markup, including HTML elements, and parameters and attribute values of HTML elements. For example, rendering engine 112 may extract parameters and attributes from a form input element (i.e., <form> HTML element), including an ACTION attribute that specifies a web resource of web application 106 to which HTTP requests may be directed, a METHOD attribute that specifies a type of HTTP verb (e.g., GET, POST, PUT) for HTTP requests. In some embodiments, rendering engine 112 may detect portions of the parsed HTML markup that specifies a canvas input element (i.e., <canvas> HTML element) and its associated parameters and attribute values.

In one embodiment, rendering engine 112 may detect interpreted program code in the web content, such as JavaScript, and hand off processing of the web content to script interpreter 114. In one implementation, the received web content may include JavaScript code that invokes a call to a JavaScript library or framework configured to dynamically generate new HTML elements or modify existing HTML elements that form a UI of the web application, referred to herein as a web UI framework. As such, script interpreter 114 may detect interpreted program code that invokes (e.g., via JavaScript calls) such a web UI framework and extracts information from the interpreted program code, including call parameters, property invariants, literal values, that specify aspects of the user interface. In some embodiments, rendering engine 112 may detect that the interpreted program code in the web content is configured to dynamically generate or modify a form input element (i.e., <form>), a canvas input element (i.e., <canvas>), and other HTML elements and may extract parameters for the associated input elements.

At step 214, UIV agent 104 generates UI metadata 132 based on the parsed web content. In one embodiment, UI metadata 132 includes information parsed from the web content that are descriptive of one or more UI elements of the web application. In one embodiment, information in the UI metadata 132 may be organized into a hierarchical or tree-like data structure having root elements and child elements corresponding to web UI elements of a web application. Examples of UI elements that may be specified by UI metadata 132 include windows, buttons, menus, dialog or message boxes, lists, menu bars, scroll bars, title bars, status bars, size grips, toolbars, tree view controls, list view controls, dropdown lists, and input carets. For example, rather than merely providing graphical primitives for drawing a rectangle menu, UI metadata 132 provides semantic information representing the contents of the menu, such as the selectable options in the menu. Based on UI metadata 132, UIV access client 110 may independently render GUI elements that display, behave, and are interacted with differently than corresponding UI elements on a standard web browser (e.g., executing on a user desktop). As such, UI metadata 132 enables UIV access client 110 to generate, render, and display native GUI elements that are most appropriate for the interface style and form factor of client device 108 (e.g., touch screen).

In one embodiment, UI metadata 132 may include, for each UI element specified, a label or unique identifier for a UI element (e.g., assigned in HTML markup or JavaScript code by a developer of web application 106); element information describing the type of UI element (e.g., FORM, RADIO, INPUT, SELECT); properties that describe a UI element's state at a given moment in time (e.g., invisible, unavailable, focused, focusable, pressed, etc); and other values contained in a UI element (e.g., percentages, integers, non-integers, textual, visual) that may indicate information represented by the UI element. For example, UI metadata 132 may include information for an HTML form that includes an identifier (e.g., id="myForm"), an action attribute indicating HTTP requests should be transmitted to "http://www.example.com/get.php", and information for UI elements contained within the HTML form (e.g., a drop-down menu, text input fields). In some embodiments, UI metadata 132 may include graphical data, such as thumbnails or icons, associated with UI elements for web application 106.

According to one embodiment, UIV agent 104 may maintain a mapping between parsed web content and UI metadata generated therefrom. Such a mapping may be used to process UI input events later received that refer to interactions with UI elements corresponding to parts of the parsed web content. For example, UIV agent 104 may store information extracted from an HTML page that relates to submitting an HTML form, and use that extracted information when later receiving a UI input event associated with submission of the HTML form. As such, the mapping enables UIV agent 104 to translate between communications with web application 106 (in the form of HTTP requests) and interactions with native GUI elements on client device 108.

At step 216, UIV agent 104 renders web content of web application 106. In some embodiments, UIV agent 104 may use display backend 116 to generate a rendered form of web content that is displayable at client device 108. In some embodiments, the rendered form of web content may include at least a rendered view of the web UI element. In one embodiment, display backend 116 renders web content in a form factor suitable for client device 108, such as, using larger font sizes, dimensions restrictions (e.g., height, width), etc. In some embodiments, rendered web content may be raw pixel data, similar to a screenshot, of the GUI (i.e., presentation tier) of web application 106 to be displayed at the client device. In other embodiments, rendered web content may be drawing operations and graphical primitives for drawing the display of the GUI of web application 106 within a client GUI of the client device. In other embodiments, rendered web content may be intermediate data structures formed by the parsing of web content by rendering engine 112, such as HTML element trees, HTML layout trees, etc.

At step 218, UIV agent 104 transmits the rendered web content 126 and UI metadata 132 to a UIV access client 110 executing on client device 108. In one embodiment, the UIV agent 104 and UIV access client 110 may use a messaging bus or message passing service to transmit and receive rendered web content 126, UI input events 130, and UI metadata 132 across network 120. In another embodiment, UIV agent 104 may incorporate UI metadata 132 within the rendered web content passed through a remote display channel (e.g., PCoIP, HTML5) to UIV access client 110. Similarly, UIV access client 110 may incorporate UI input events 130 within remote display channel data transmitted to UIV agent 104.

At step 220, UIV access client 110 receives the rendered web content 126 and UI metadata 132. At step 222, UIV access client 110 generates a native GUI element 124 based on the UI metadata. In one embodiment, UIV access client 110 generates native GUI elements configured to be "touch-friendly." For example, UIV access client 110 generates native GUI elements having a size and shape that more readily facilities activation by a touch object (e.g., human finger or stylus) as compared to a GUI element configured for activation by a pointer or mouse cursor. In another example, UIV access client 110 generates native GUI elements responsive to touch-based input and gestures, including taps, swipes, multi-point gestures, etc. As such, the user experiences an improved user interface because UIV access client 110 enables the user to interact with native GUI elements that are rendered in a touch-friendly manner yet correspond to UI elements from the web application. Furthermore, embodiments of the present invention may use native graphical frameworks or user interface frameworks that are local to client device 108 thereby offloading work and relying on the graphical capabilities of client device 108.

At step 224, UIV access client 110 generates a client GUI 122 based on the rendered web content and the native GUI elements 124. In some embodiments, native GUI elements 124 generated at step 222 are included in the displayed client GUI 122 as UI elements overlaid on top of the rendered web content received from UIV agent 104, as shown in FIG. 1 by native GUI element 124. In some embodiments, a native UI element 124 is overlaid on the corresponding web UI element within the rendered web content. In some embodiments, the native GUI elements are included in the displayed GUI as a semi-transparent layer incorporated into the rendered web content received from UIV agent 104. In some embodiments, client GUI 122 may include a status icon 156 that indicates when native GUI elements corresponding to elements in GUI of the web application are available.

Also shown in the embodiment of FIG. 1, UI elements within the rendered web content may be annotated (as depicted by annotation 158) that indicates to the user of client device 108 that the annotated element may have a corresponding native GUI element which can be interacted with. The example in FIG. 1 depicts an annotation 158 indicating availability of a native GUI element, which is shown as a dashed border around an HTML element, thought it should be recognized that other techniques for highlighting or annotating that graphically represents a different status may be used. For example, annotations may include different background colors, borders, prominent font sizes, and mouse-over behaviors for the aforementioned annotations.

At step 226, UIV access client 110 displays client GUI 122. Operations for translating user input in input events 130 and interactions with web server 128 are shown in FIG. 2B.

Referring now to FIG. 2B, at step 250, UIV access client 110 receives an input (e.g., a touch screen input) made by the user through client GUI 122 onto one or more native GUI elements 124. In response to receiving the input, UIV access client 110 processes the input at step 252. In one example, the user input may be selection of a drop-down list of an HTML <select> element. In another example, the user input may be submission of a form, e.g., by tapping on a button in the client GUI). At step 252, UIV access client 110 generates and transmits to UIV agent 104 a UI input event corresponding to the received input for web application 106.

At step 256, UIV agent 104 receives the UI input event indicating an interaction on one or more UI elements of web application. At step 258, UIV agent 104 generates an HTTP request based on the received UI input event. In some embodiments, the generated HTTP request message may specify a URI and a HTTP request method associated with and extracted from a web form. For example, UIV agent 104 may generate an HTTP request that specifies a URL previously extracted from a form's ACTION attribute, an HTTP verb extracted from the form's METHOD attribute, and that encodes form data (e.g., key-value pairs) as part of the query string in the HTTP request. At step 260, UIV agent 104 transmits the HTTP request to web application 106, which receives the HTTP request at step 262. At step 264, web application 106 processes the request and modifies the state of the web application and returns new web content of web application in an HTTP response.

Figure 3A:
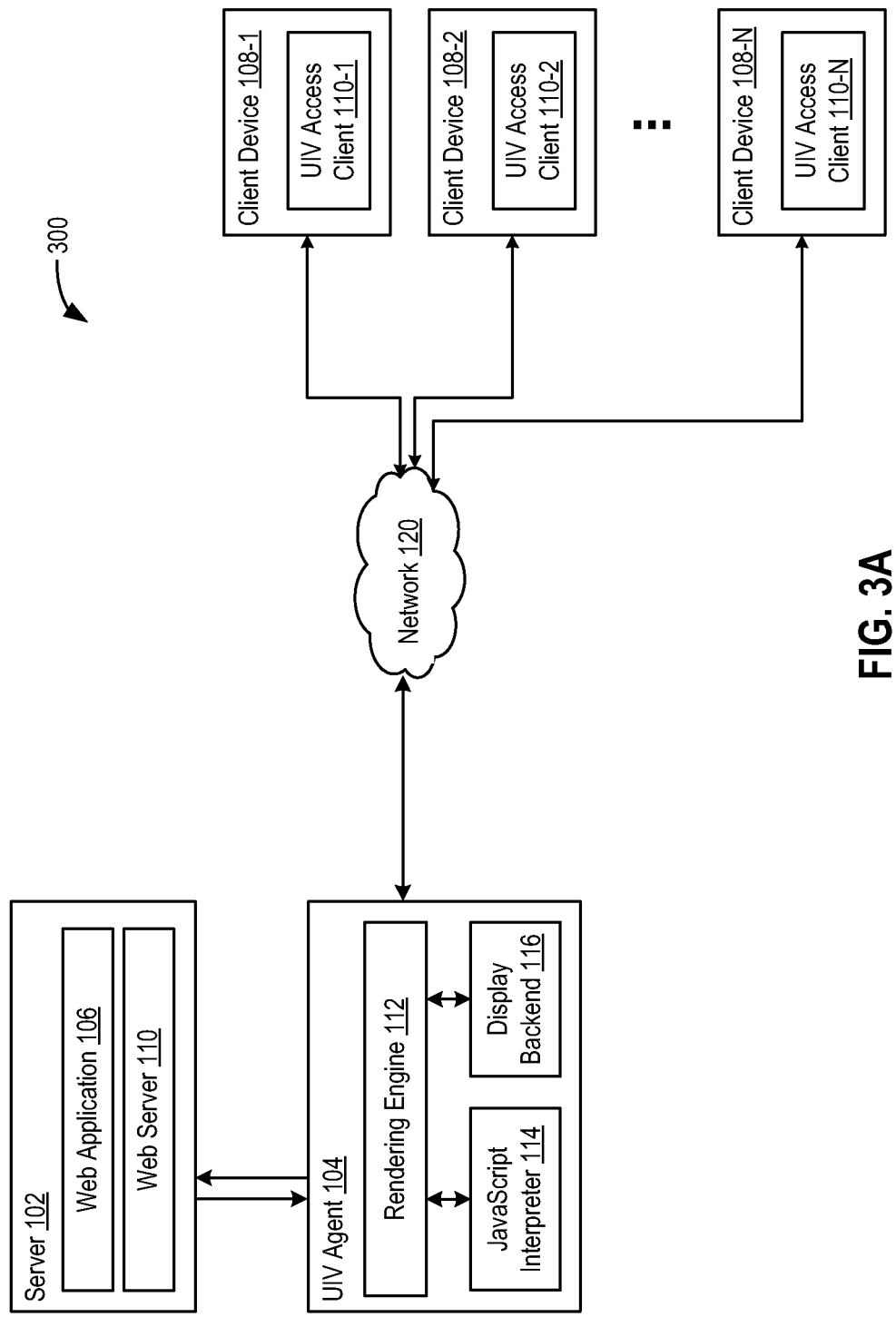
FIG. 3A illustrates a multi-user system architecture for providing access to a web application executing on a server device from a plurality of client devices, according to an alternative embodiment of the present disclosure.

FIG. 3A illustrates a multi-user system architecture 300 for providing access to a web application 106 executing on a server device from a plurality of client devices, according to an alternative embodiment of the present disclosure. In the embodiment of FIG. 3A, UIV clients 110-1, 110-2, . . . 110-N executing on a plurality of client devices 108-1, 108-2, . . . 108-N (collective referred to as 108), where each client device may be operated by different users, may connect to a single UIV agent 104 that handles proxy operations for the multiple users. As such, UIV agent 104 is configured as a central access point for accessing web application 106.

Figure 3B:
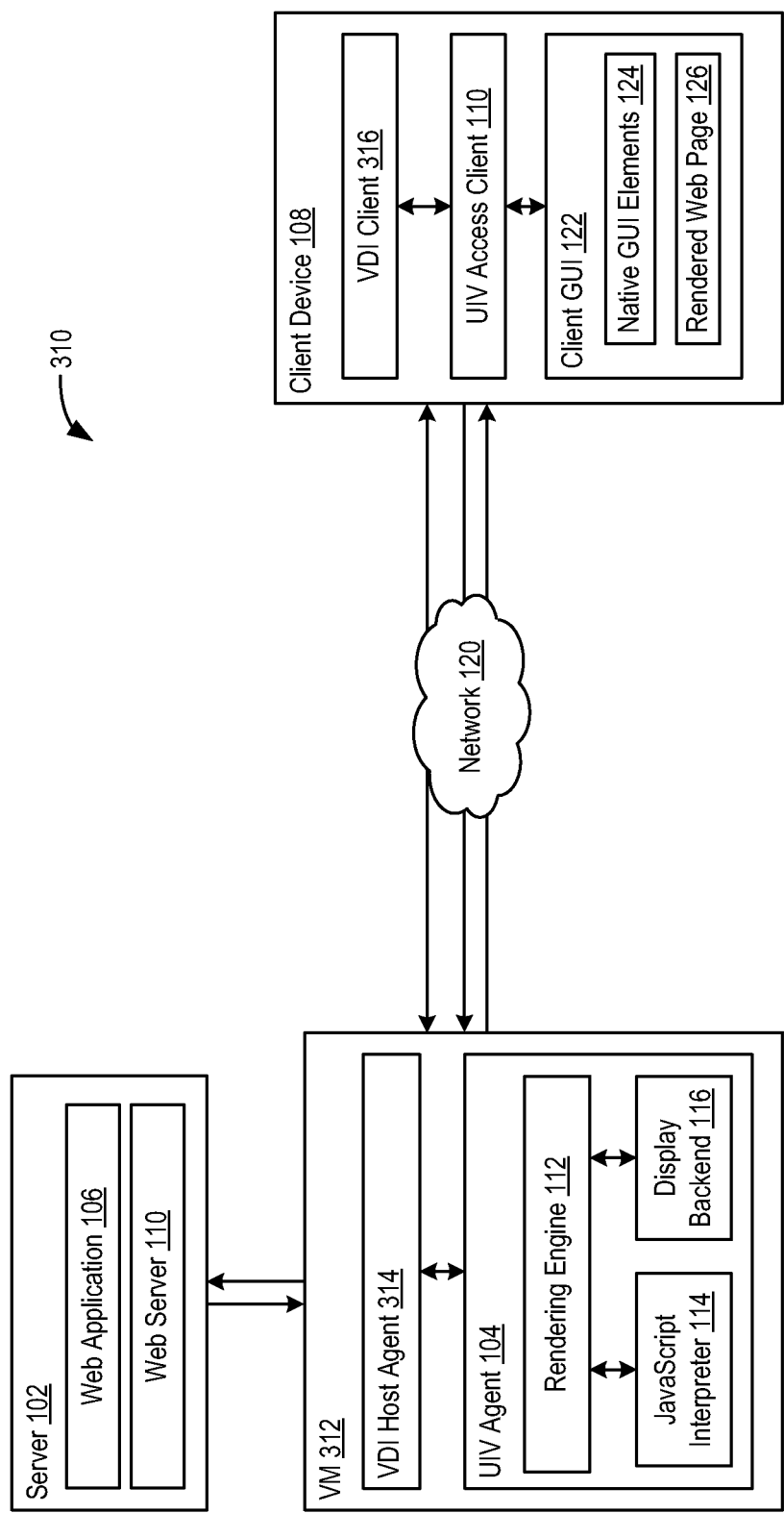
FIG. 3B illustrates a system architecture for providing access to a web application executing on a server device via components of a virtual desktop infrastructure (VDI), according to an alternative embodiment of the present disclosure.

FIG. 3B illustrates a system architecture 310 for providing access to a web application executing on a server device via components of a virtual desktop infrastructure (VDI), according to an alternative embodiment of the present disclosure. In the embodiment shown, a VDI host agent 314 executing on a VM 312 communicates with a corresponding VDI client 316 executing on client device 108 to provide remote desktop access. When a user would like to access web application 106, VDI host agent 314 uses UIV agent 104 to communicate with web application 106, receive and parse web content from the web application, and generate UI metadata 132 as described above.

In this embodiment, VDI host agent 314 transmits VDI data to VDI client 316 according to known remote display techniques, and incorporates UI metadata 132 that specifies UI elements of web application 106. Upon receiving UI metadata 132, VDI client 316 uses UIV access client 110 running on client device 108 to generate native GUI elements 124 as described above, and returns UI input events to VDI host agent 314 responsive to user touch input.

FIG. 3C illustrates a system architecture 320 for providing access to a web application executing on a server device via an agent executing local to a client device, according to an alternative embodiment of the present disclosure. In the embodiment shown, UIV agent 104 resides on client device 108 and acts as a local proxy for UIV access client 110. In such an embodiment, requests to access web application 106 are routed through UIV agent 104, which processes received web content and enables UIV access client 110 to generate native GUI elements, as described above.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of providing access to a web application executing on a server device, the method comprising:
receiving, by a first server from a web server, point-and-click web content designed to be rendered for use with a point-and-click input device, wherein the point-and-click web content is associated with a web application, and further wherein the point-and-click web content includes a markup document and interpreted program code;

translating, by the first server, the point-and-click web content to touch-input user interface (UI) metadata;

transmitting, by the first server, a rendered web content and the touch-input UI metadata to a touch input device;

wherein the translating comprises:
rendering the received point-and-click web content to generate the rendered web content, which includes a graphical representation of the web application;

parsing the received point-and-click web content for information descriptive of one or more UI elements; and generating the touch-input UI metadata based on the information descriptive of the one or more UI elements, wherein the touch-input UI metadata is used by the touch input device to independently generate at the touch input device one or more native UI elements corresponding to the one or more UI elements, wherein the touch-input UI metadata includes semantic information descriptive of display style of the one or more UI elements.

2. The method of claim 1, wherein the parsing the received point-and-click web content for information descriptive of one or more UI elements further comprises:
determining that a portion of the interpreted program code specifies parameters for a form input element of the markup document.

3. The method of claim 1, wherein the parsing the received point-and-click web content for information descriptive of one or more UI elements further comprises:
determining that a portion of the interpreted program code specifies parameters for a canvas input element of the markup document.

4. The method of claim 1, further comprising:
receiving, from the touch input device, an input event indicating a user interaction with the one or more UI elements for the web application;

generating an HTTP request message based on the received input event and on the point-and-click web content for the web application; and transmitting, to the web server, the generated HTTP request message for the web application.

5. The method of claim 4, wherein the generating the HTTP request message further comprises:
responsive to determining the one or more UI elements specified by the input event is a form input element of a web form, extracting a uniform resource identifier (URI) and a HTTP request method associated with the web form from the point-and-click web content; and
generating the HTTP request message to specify the extracted URI and HTTP request method associated with the web form.

6. The method of claim 1, wherein the markup document comprises an HTML document, and the interpreted program code comprises JavaScript code.

7. The method of claim 1, wherein the rendered web content include a rendered view of the one or more UI element.

8. A method of generating a local graphical user interface on a touch screen of a client device for a web application executing on a server device, the method comprising:

receiving, from a proxy agent running on a first server, (i) rendered web content that is generated by rendering unrendered point-and-click web content designed to be rendered for use with a point-and-click input device, the unrendered point-and-click web content being associated with the web application, and (ii) touch-input user interface (UI) metadata obtained by translating, by the first server, the point-and-click web content to the touch-input UI metadata;

generating, at the client device, one or more native UI elements based on the received touch-input UI metadata, wherein the one or more native UI elements correspond to a one or more UI elements of the web application;

generating a local graphical user interface having the rendered web content and the native UI element to display on the touch screen of the client device;

responsive to detecting user input via the native UI element, transmitting to the proxy agent an input event indicating user interaction of the corresponding one or more UI elements of the web application;

wherein the translating comprises:
rendering the point-and-click web content to generate the rendered web content, which includes a graphical representation of the web application;

parsing the received point-and-click web content for information descriptive of one or more UI elements; and generating the touch-input UI metadata based on the information descriptive of the one or more UI elements, wherein the touch-input UI metadata is used by client device to independently generate at the client device the one or more native UI elements corresponding to the one or more UI elements, wherein the touch-input UI metadata includes semantic information descriptive of display style of the one or more UI elements.

9. The method of claim 8, wherein the received touch-input UI metadata specifies at least one of: parameters of an HTML form input element of the web application, and parameters for a canvas input element of the web application.

10. The method of claim 8, further comprising:
annotating the one or more UI elements within the rendered web content to indicate availability of the one or more native UI elements.

11. The method of claim 8, wherein the rendered web content received from the proxy agent includes a rendered view of the one or more UI elements.

12. The method of claim 8, wherein the local graphical user interface displayed on the client device comprises the one or more native UI elements overlaid on the corresponding one or more UI elements within the rendered web content.

13. A non-transitory computer-readable storage medium comprising instructions that, when executed in a computing device, provide access to a web application executing on a server device by performing the steps of:

receiving, by a first server from a web server, point-and-click web content designed to be rendered for use with a point-and-click input device, wherein the web content is associated with a web application, and further wherein the point-and-click web content includes a markup document and interpreted program code;

translating, by the first server, the point-and-click web content to touch-input user interface (UI) metadata;

transmitting, by the first server, a rendered web content and the touch-input UI metadata to a touch input device;
wherein the translating comprises:
rendering the received point-and-click web content to generate the rendered web content, which includes a graphical representation of the web application;
parsing the received point-and-click web content for information descriptive of one or more UI elements;
generating the touch-input UI metadata based on the information descriptive of the one or more UI elements, wherein the touch-input UI metadata is used by the touch input device to independently generate at the touch input device one or more native UI elements corresponding to the one or more UI elements, wherein the touch-input UI metadata includes semantic information descriptive of display style of the one or more UI elements.

14. The non-transitory computer-readable storage medium of claim 13, wherein the parsing the received point-and-click web content for information descriptive of one or more UI elements further comprises:
determining that a portion of the interpreted program code specifies parameters for a form input element of the markup document.

15. The non-transitory computer-readable storage medium of claim 13, wherein the parsing the received point-and-click web content for information descriptive of one or more UI elements further comprises:
determining that a portion of the interpreted program code specifies parameters for a canvas input element of the markup document.

16. The non-transitory computer-readable storage medium of claim 13, further comprising:
receiving, from the touch input device, an input event indicating a user interaction with the one or more UI elements for the web application;
generating an HTTP request message based on the received input event and on the point-and-click web content for the web application; and
transmitting, to the web server, the generated HTTP request message for the web application.

17. The non-transitory computer-readable storage medium of claim 16, wherein the generating the HTTP request message further comprises:
responsive to determining the one or more UI elements specified by the input event is a form input element of a web form, extracting a uniform resource identifier (URI) and a HTTP request method associated with the web form from the point-and-click web content; and
generating the HTTP request message to specify the extracted URI and HTTP request method associated with the web form.

18. The non-transitory computer-readable storage medium of claim 13, wherein the markup document comprises an HTML document, and the interpreted program code comprises JavaScript code.

19. The non-transitory computer-readable storage medium of claim 13, wherein the rendered web content include a rendered view of the one or more UI elements.

20. A non-transitory computer-readable storage medium comprising instructions that, when executed in a computing device, generate a local graphical user interface on a touch screen of a client device for a web application executing on a server device by performing the steps of:
receiving, from a proxy agent running on a first server, (i) rendered web content that is generated by rendering unrendered point-and-click web content designed to be rendered for use with a point-and-click input device, the unrendered point-and-click web content being associated with the web application, and (ii) touch user interface (UI) metadata obtained by translating, by the first server, the point-and-click web content to the touch-input UI metadata;
generating, at the client device, one or more native UI element based on the received touch-input UI metadata, wherein the one or more native UI elements correspond to a one or more UI elements of the web application;
generating a local graphical user interface having the rendered web content and the native UI element to display on the touch screen of the client device;
responsive to detecting user input via the native UI element, transmitting to the proxy agent an input event indicating user interaction of the corresponding one or more UI elements of the web application;
wherein the translating comprises:
rendering the point-and-click web content to generate the rendered web content, which includes a graphical representation of the web application;
parsing the received point-and-click web content for information descriptive of one or more UI elements; and
generating the touch-input UI metadata based on the information descriptive of the one or more UI elements, wherein the touch-input UI metadata is used by the client device to independently generate at the client device the one or more native UI elements corresponding to the one or more UI elements, wherein the touch-input UI metadata includes semantic information descriptive of display style of the one or more UI elements.

21. The non-transitory computer-readable storage medium of claim 20, wherein the received touch-input UI metadata specifies at least one of: parameters of an HTML form input element of the web application, and parameters for a canvas input element of the web application.

22. The non-transitory computer-readable storage medium of claim 20, further comprising:
annotating the one or more UI elements within the rendered web content to indicate availability of the one or more native UI elements.

23. The non-transitory computer-readable storage medium of claim 20, wherein the rendered web content received from the proxy agent includes a rendered view of the one or more UI elements.

24. The non-transitory computer-readable storage medium of claim 20, wherein the local graphical user interface comprises the one or more native UI element overlaid on the corresponding one or more UI element within the rendered web content.

* * * * *